Feb. 8, 1949. H. T. PENTECOST 2,461,348
HELICOPTER OF THE CO-AXIAL WING TYPE
Filed Oct. 17, 1945 2 Sheets-Sheet 1
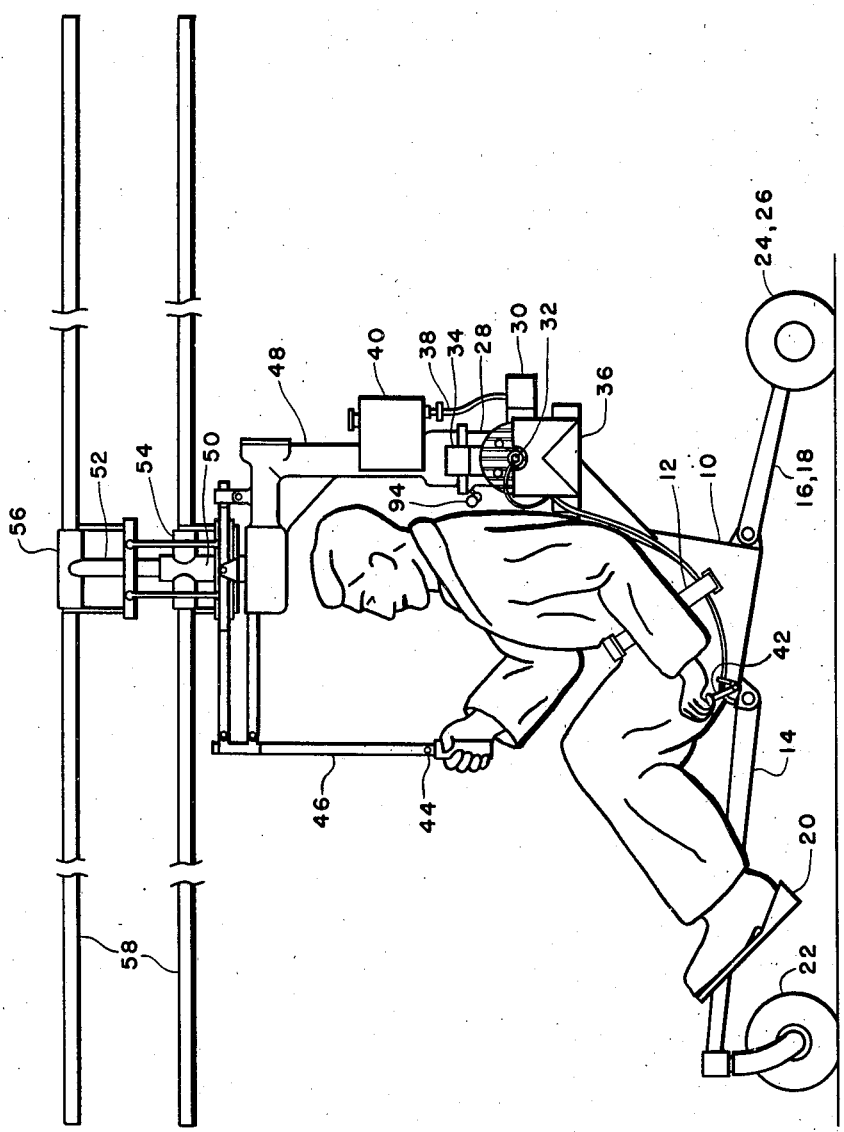
HORACE T. PENTECOST
INVENTOR.

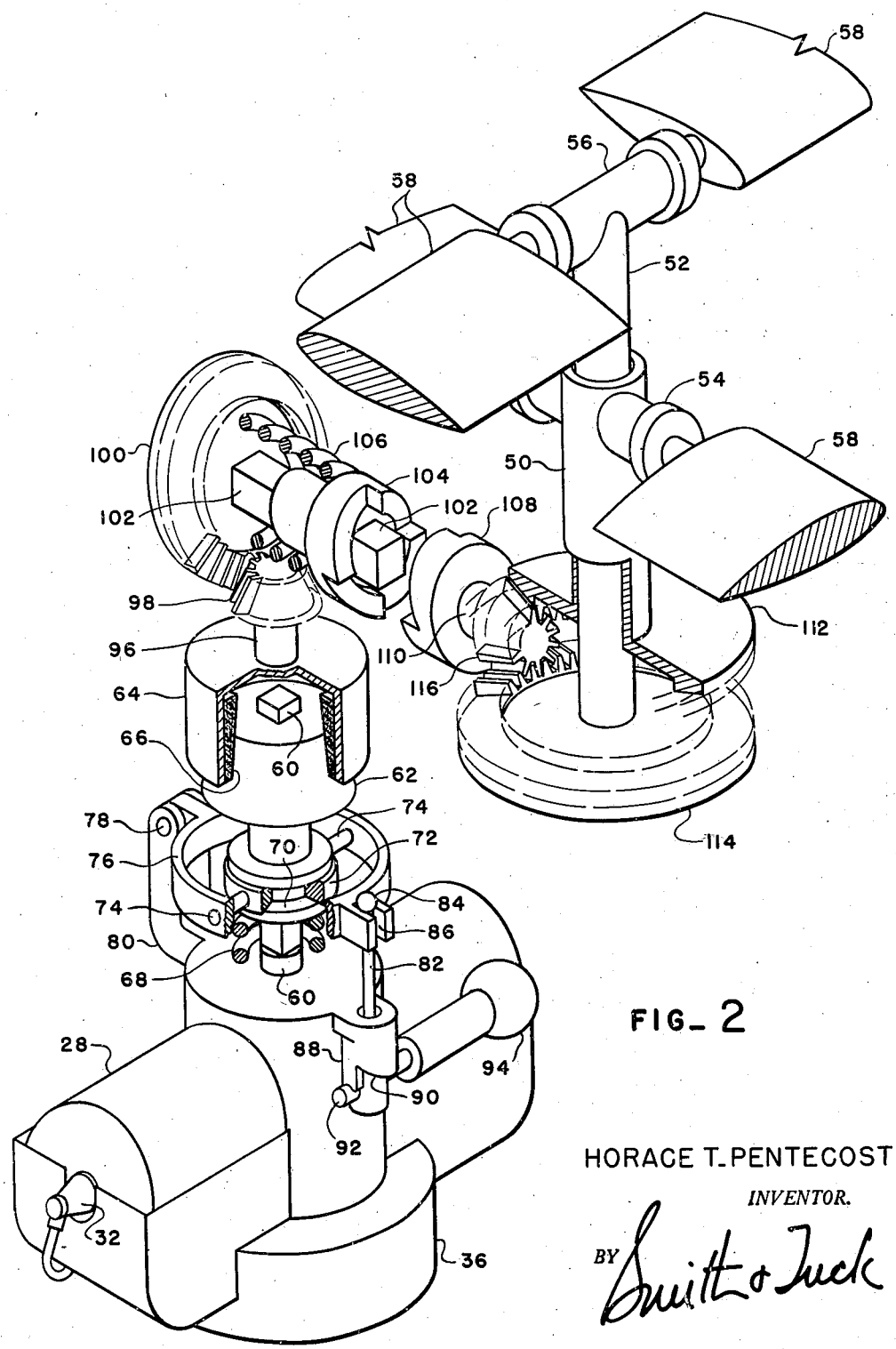
FIG_2

Patented Feb. 8, 1949

2,461,348

UNITED STATES PATENT OFFICE 2,461,348

HELICOPTER OF THE COAXIAL WING TYPE

Horace T. Pentecost, Renton, near Seattle, Wash.

Application October 17, 1945, Serial No. 622,727

4 Claims. (Cl. 244—17.23)

The prior art is well known for its costly and complex helicopter mechanisms, among the criticisms being inadequate provisions for variable passenger or freight loading, while at the same time maintaining maximum efficient helicopter control and operation. This largely arises because the previous inventors have given more attention to obtaining flight than they have to securing economy of construction and simplification of passenger accommodations, powering and power-transmission.

Having the foregoing in mind, it is a prime object of this invention to provide in a helicopter the support of a useful load in a position that approximately coincides with the center of lift of the craft so that any change in the magnitude of the useful load will have the least effect upon the flight characteristics of the craft.

Another object of the invention is the provision in a helicopter of an engine loading that is cantilevered below and offset from the center of lift of the wing with the variable passenger and other loading positioned to bring, in a compact structure, the center of gravity in substantial alignment below the center of lift.

A further object of the invention is the provision of an offset transmission structure between a helicopter wing and an engine whereby the variable load to which the craft is normally subjected is brought in under the lift of the wing in approximate coincidence.

The foregoing objects and other ancillary thereto I prefer to accomplish as follows:

In a helicopter, preferably of the counter-rotary coaxial wing type, I employ an engine for empowering the rotary wing elements. This engine is positioned below and not necessarily coaxial with the wing and for convenience is materially offset from the axis of the wing. Between the wing and the engine is an inverted L-shaped housing for tying the engine to wing and for enclosing the power transmission means which include opposed gear elements on the two shafts of the counter-rotary wings with both of which mesh a pinion that is driven through a unidirectional coupling. The shaft of the engine enters the housing and joins with a change-speed change-direction gear train through a manually operable clutch. Supported from the engine is a load-bearing framework that is so arranged and adapted that it will accommodate variable loads and will position the same in under the center of lift of the wing elements. Such may or may not include enclosing means for the load which usually is the pilot and may include passengers or freight.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

Figure 1 is a side elevation of a small helicopter embodying my invention; and

Figure 2 is a perspective view of the power transmission means thereof.

Referring in detail to the drawing in which one form of the invention is illustrated, the aircraft comprises a seat 10 in which a pilot may sit and be thus carried by the craft as he operates it. A safety belt 12 is attached to the seat 10 to hold the pilot securely. Also attached to the seat 10 and comprising the aircraft are a forward leg 14 and two rear legs 16, 18. These legs preferably extend radially and are shown free to pivot in a vertical plane but may be restrained by suitable shock absorbing means. Attached to forward leg 14 is foot rest 20 on which the pilot may place his feet during flight. Also attached to, and free to caster about a vertical axis concentric with the extremity of the forward leg 14, is a pneumatic wheel 22. Pneumatic wheels 24 and 26 are mounted rotatable about the same horizontal axis at the extremities of rear legs 16 and 18 and complete the ground engaging equipment of the craft.

Fastened to the upper back of the seat 10 and also comprising the craft is an engine 28, including carburetor 30, spark plug 32, exhaust stacks 34, air-cooling baffle 36, fuel line 38, and fuel tank 40. One form of the engine which may be used to furnish power for sustaining flight of the craft is of the internal combustion two-stroke, two cylinder opposed type. The engine is forced air-cooled by means of paddles attached to the flywheel, which wheel also houses the magneto. Starting may be in the manner customary with outboard type marine motors.

The flywheel is preferably mounted on the under side of the engine, with the crankshaft axis upright and the power end of the shaft upwards of the engine. Throttle control 42 is connected to the carburetor 30 for manual engine speed and power control, or an inertia type throttle governing device of conventional nature may be used to maintain constant engine speed with the manual throttle 42 serving as an over-ride control for use when emergency power is required, or other unusual operating requirements dictate its use. Switch device 44 shorts the primary circuit of the engine magneto system and is shown conveniently located on the flight control handle 46, where the operator may quickly stop the engine by depressing the button of the switch device with his thumb.

Also comprising the aircraft and fitted to the upper end of the engine 28 is a transmission case 48, housing the power transmission mechanism, the details of which are more fully explained later. Extending above the transmission case 48 and forming part of the mechanism therein are the coaxial counter-rotating shafts 50 and 52, to which are attached the hubs 54 and 56 respectively.

Extending from each hub 54 and 56, and also comprising the aircraft, are pairs of rotor blades 58. These may be of the size and configuration most advantageous in obtaining maximum performance and greatest economy for the craft as determined by aerodynamic and power calculations. A blade may be selected with a symmetrical airfoil section and a center of pressure which falls approximately at the quarter chord point. A blade is hinged to its rotor hub so that it may rotate about a longitudinal axis coinciding with its center of pressure axis or at a point quarter distant between leading and trailing edge. Very little force then is required to change its relative angle of attack throughout a sufficiently wide range to encompass both the maximum and minimum angles normal to helicopter rotor blade operation in flight. For this reason, the pilot may be able to directly and manually control the blade angles during flight without undue effort. The mechanism required to position and maintain the blade angles necessary for controlled flight is more fully described in my co-pending application, Serial No. 621,254, filed October 9, 1945.

The foregoing largely comprises the aircraft selected to illustrate my invention.

Control handle 46 may be moved by the pilot in any direction he wishes the craft to fly. It may be moved up or down, the result being a simultaneous increase or decrease in the angle of attack or pitch of all rotor blades. With an upward push of the control handle 46 and an increase in blade angles, together with an increase in engine power either by manual or automatic adjustment of the throttle 42, the craft will climb. By pushing the control handle 46 forward, the blades of both the upper and lower rotors may be cyclically pitched in such a manner as to create an unbalanced total lift and resultant thrust to the craft in a forward direction. A motion of the control handle, in fact, in any direction away from its normal position parallel to the axis of the coaxial rotor shafts can result in a lateral thrust to the craft toward that direction. By twisting the control handle 46, the pitch of the blades of one rotor may be changed relative to the pitch of the blades of the other rotor, thereby upsetting the torque balance between the counter-rotary elements and resulting in the craft itself rotating about the axis of the coaxial shafts. A twist, then, of the control handle either to the right or left results in the craft rotating to the right or left, and completes the control means necessary to operate the craft in flight.

Referring to Figure 2 which details the relationship of parts comprising the power transmission mechanism of the craft, and which concerns my invention more specifically, engine shaft 60 is splined to engage at its hub cone member 62 of a manually controllable clutch of typical conventional design. The cone member 62 is free to slide axially along the engine shaft 60 and is normally held engaged within a cup member 64 and against a composition facing 66 attached thereto. The pressure of a helical compression spring 68 forces the cone upward and away from the frame of the engine 28 and into cup 64. Means are provided for overcoming the pressure of spring 68 by external and manual force to disengage the cone member 62 from the cup member 64 and the transmission of engine torque from the former to the latter.

Cone member 62 includes an annular track 70, in which is positioned and free to slide therein, a shoe 72 to which are attached diametrically opposed pins 74. These pins extend through collar 76, which is fulcrumed about pin 78 held stationary in respect to the frame of the engine 28 by an arm 80. Rod 82, terminated at one end by a ball 84, is positioned in fork 86 formed on the collar 76. The rod 82 therebelow extends through support bracket 88 having cam surfaces 90 on which travel clutch handle pin 92 which extends through, and at right angles to rod 82.

It will be evident that as clutch control handle 94 is swung about the axis of the rod 82, the cam surfaces 90 will control the position of the rod 82 and ball 84 longitudinally in respect to the axis of the engine shaft 60. The position of the collar 76, pins 74, shoe 72, track 70, and the cone member 62 are likewise determined by the rotation of the clutch control handle 94. Thus, cam surfaces 90 may be so shaped and located as to allow the engaging, or force the disengaging of, the cone member 62 and the cup member 64 as the clutch control handle 94 is rotated about the axis of rod 82. It will be understood that any other conventional clutching means, including those of the automatic or semiautomatic, centrifugal or inertia type, mechanical, electric or hydraulic clutches, may be substituted for the means just illustrated in the power transmission and torque conversion mechanism described herein without affecting the substance of my invention.

Shaft 96 is attached to the driven member, or cone member 64, of the clutch and transmits the engine torque to pinion 98, meshing with gear 100, which in turn is fastened to splined shaft 102, thereby reducing its speed and changing the direction of the axis of rotation of the power train.

Sliding on spline shaft 102, but radially fixed thereto, is a slidable ratchet member 104 of an automatic one-way or over-run clutch. Helical compression spring 106 forces the slidable ratchet member 104 away from the gear 100 and along splined shaft 102 to normally rest against mating ratchet member 108 fixed to a shaft 110, and all of which are coaxial. For purposes of more clearly illustrating the function of the parts, this portion of the transmission mechanism has been exploded in Figure 2. The matching faces of the ratchet members 104, 108 have radial teeth with helical back faces fashioned in such a way as to transmit the rotation and power of the slidable ratchet member 104 to the mating ratchet member 108 and thus to the remainder of the transmission. This arrangement allows the mating ratchet member 108 free to continue rotating in its normal direction even though the splined shaft 102 has stopped delivering engine torque. In this case, the slidable ratchet member 104 will be forced to oscillate against the pressure of the spring 106, back and forth along the idle shaft 102 as the teeth of the revolving mating ratchet member 108 click past those of the sliding ratchet member 104.

Fixed at the end of the shaft 110 and meshing with the upper and lower differential gears 112 and 114 is pinion 116, the combination of which reduces further the rotational speed of the train and again changes the direction of the axis of rotation, as well as dividing the torque thus far delivered to the two counter-rotating coaxial shafts 50 and 52, which are fixedly attached to the superposed gears 112 and 114 respectively.

It is, then, evident that as the engine shaft 60 revolves in its power cycles with the manual clutch means engaged the rotor hubs 54 and 56 and their pairs of blades 58 will be driven counter-rotatably at a reduced speed determined by the proportions of the pinion and gear combinations used in the train. It should also be evident that in the event of a stoppage of the engine power, the pairs of rotor blades 58 can continue to rotate in their normal counter-rotary directions while still being mechanically interrelated in order to maintain their normal comparative rates of speed. This latter feature is utilized in maintaining directional control of the craft in its auto-rotational flight as more fully explained in my co-pending application, Serial No. 621,254, filed October 9, 1945.

It should further be evident that the configuration of the mechanism described lends itself to being housed within an inverted L-shaped enclosing means such as that shown in Figure 1 as a transmission case 48 with bearings provided as needed. This casing, beside comprising the aircraft and constituting a rigid member thereof, makes possible the positioning of the composite aircraft and operator center of gravity, below and concentric with the normal center of lift of the sustaining rotors, which is also concentric with the axis of the rotor shafts 50 and 52.

Although I have shown and described certain specific embodiments of my invention, I am fully aware that many modifications thereof are possible. My invention, therefore, is not to be restricted except insofar as is necessitated by the prior art and by the spirit of the appended claims, as follows:

1. In a helicopter of the counter-rotary co-axial wing type, an internal combustion engine having substantially opposed cylinders and an upright drive shaft, a frame attached to said engine and adapted to carry variable loads to one side thereof, a structural column solely supported by and rising above said engine and providing support for the drive shaft of said engine, a laterally disposed structural member rigid with said column and overlying said load-carrying frame, an intermediate shaft supported by said laterally disposed structural member and including an over-running coupling between its ends, bevel gearing between said engine drive shaft and said intermediate shaft, and counter-rotating bevel gearing between said intermediate shaft and said rotary wings.

2. In a helicopter of the counter-rotary coaxial wing type, an internal combustion engine having an upright drive shaft, a frame attached to said engine and adapted to carry variable loads to one side thereof, a structural column solely supported by and rising above said engine and providing support for the drive shaft of said engine, a laterally disposed structural member rigid with said column and overlying said load-carrying frame, an intermediate shaft supported by said laterally disposed structural member and including an over-running coupling between its ends, bevel gearing between said engine drive shaft and said intermediate shaft, and counter-rotating bevel gearing between said intermediate shaft and said rotary wings.

3. In a helicopter of the counter-rotary co-axial wing type, an internal combustion engine having substantially opposed cylinders and an upright drive shaft, a frame attached to said engine and adapted to carry variable loads to one side thereof, a structural column solely supported by and rising above said engine and providing support for the drive shaft of said engine, a laterally disposed structural member rigid with said column and overlying said load-carrying frame, an intermediate shaft supported by said laterally disposed structural member and including an over-running coupling between its ends, bevel gearing between said engine drive shaft and said intermediate shaft, counter-rotating bevel gearing between said intermediate shaft and said rotary wings, and means for varying the pitch of said wings and including a manually operable actuator pivotally supported from said laterally disposed structural member and disposed before an operator positioned in said load-carrying frame.

4. In a helicopter of the counter-rotary co-axial wing type, an internal combustion engine having an upright drive shaft and cylinders located on opposite sides of the axis of said drive shaft, a frame attached to said engine and adapted to carry variable loads to a side of said engine lateral of a plane lying within the opposed engine cylinders and closely adjacent thereto, a structural column solely supported by and rising above said engine and providing support for the drive shaft of said engine, a laterally disposed structural member rigid with said column and overlying said load-carrying frame, an intermediate shaft supported by said laterally disposed structural member and including an over-running coupling between its ends, bevel gearing between said engine drive shaft and said intermediate shaft, and counter-rotating bevel gearing between said intermediate shaft and said rotary wings.

HORACE T. PENTECOST.

REFERENCES CITED

The following references are of record in the file of this patent:

UNITED STATES PATENTS

| Number | Name | Date |
|---|---|---|
| 1,919,089 | Breguet et al. | July 18, 1933 |
| 1,921,805 | Bordoni | Aug. 8, 1933 |
| 2,037,745 | Vaughn | Apr. 21, 1936 |
| 2,070,610 | Myers | Feb. 16, 1937 |
| 2,180,922 | Bothezat | Nov. 21, 1939 |
| 2,192,881 | Bothezat | Mar. 12, 1940 |
| 2,256,918 | Young | Sept. 23, 1941 |
| 2,321,572 | Campbell | June 15, 1943 |